United States Patent [19]

Witherspoon

[11] Patent Number: 5,240,893
[45] Date of Patent: Aug. 31, 1993

[54] METHOD OF PREPARING METAL-HETEROCARBON-NITROGEN CATALYST FOR ELECTROCHEMICAL CELLS

[75] Inventor: Romeo R. Witherspoon, Shelby Township, Macomb County, Mich.

[73] Assignee: General Motors Corporation, Detroit, Mich.

[21] Appl. No.: 894,696

[22] Filed: Jun. 5, 1992

[51] Int. Cl.$^5$ ............... H01M 4/88; H01M 4/96; B01J 21/18; B01J 23/70
[52] U.S. Cl. ................... 502/101; 204/294; 264/29.5; 427/115; 429/42; 429/44; 502/182; 502/185
[58] Field of Search ............... 502/101, 159, 180–185, 502/423, 437; 429/44, 42; 427/122, 115, 113; 264/29.5, 105; 204/294

[56] References Cited

U.S. PATENT DOCUMENTS

| | | | |
|---|---|---|---|
| 3,297,490 | 1/1967 | Barber et al. | 502/101 |
| 3,755,193 | 8/1973 | Luft et al. | 502/180 |
| 3,806,466 | 4/1974 | Bird et al. | 502/185 |
| 3,985,578 | 10/1976 | Witherspoon | 429/44 |
| 4,849,251 | 7/1989 | Tanaka | 427/122 |
| 5,151,515 | 9/1992 | Cisar | 502/101 |
| 5,171,644 | 12/1992 | Tsou et al. | 502/155 |

OTHER PUBLICATIONS

E. B. Yeager, J. A. Molla and S. Gupta, Proceedings of the Workshop on Carbon, Proceedings vol. 84–5, The Electrochemical Society Inc., Aug. 17–19, 1983.
G. Richter & G. Luft, Proceedings of the 4th Int'l Symposium on Fuel Cells, Antwerp Belgium, 1972.
G. Gruenig, Electrochimica Acta, 31, No. 8, 1408 (1984).

Primary Examiner—Paul E. Konopka
Attorney, Agent, or Firm—Lawrence B. Plant

[57] ABSTRACT

In a preferred method, electrodes are formed with a catalyzed carbon substrate for use in an electrochemical cell. The catalyzed carbon substrate basically comprises carbon particles having internal and external surfaces defining a plethora of pores; and a pyrolyzed metal-doped copolymer material supported on the internal and external surfaces of the carbon particles. The pyrolyzed metal-doped material is a metal/nitrogen-carbon complex where the metal is complexed with the heterocarbon/nitrogen.

Substrates of catalyzed carbon particles are prepared by first reacting an amine compound with formaldehyde and/or polymerized formaldehyde in solution, in the presence of a catalyst, carbon particles and a metal salt, at a temperature and at a rate of stirring sufficient to provide a polymerized product in the form of a gel. Then the gel is heated (pyrolyzed) in an inert atmosphere for a time sufficient to provide the catalytic carbon particles in the form of a powder. The powder is then mixed with a binder, and electrodes are pressed and formed into a suitably shaped substrate of catalytic carbon.

16 Claims, 6 Drawing Sheets

5,240,893

METHOD OF PREPARING METAL-HETEROCARBON-NITROGEN CATALYST FOR ELECTROCHEMICAL CELLS

FIELD OF THE INVENTION

This invention relates to catalyzed carbon-based substrates for electrodes, and in particular to catalysts which are active for oxygen reduction at the positive electrode.

BACKGROUND OF THE INVENTION

Electrochemical cells are desirable for various applications when operated as fuel cells. During operation, fuel cells typically consume hydrogen or methanol and oxygen or air to provide electrical power. Although such cells are used in space applications, they have not been favored for transportation use. The cost of power produced by a fuel cell is several orders of magnitude greater than the cost of other power generation alternatives, partly because of the cost of conventional electrodes. However, power produced from hydrogen or methanol is desirable because hydrogen is environmentally acceptable and hydrogen fuel cells are efficient. It is desirable to have a fuel cell which does not require precious metal catalysts, in order to reduce cost and render fuel cells more attractive for transportation use. It is also desirable to have electrodes suitable for use in metal-air batteries, as oxygen sensors, oxygen recombination catalysts and end-of-charge detection for use with batteries.

SUMMARY OF THE INVENTION

In a preferred method, electrodes are formed with a catalyzed carbon (catalytic) substrate. Such electrodes are particularly well suited for use in an electrochemical cell. The catalyzed carbon substrate basically comprises carbon particles having internal and external surfaces defining a plethora of pores; and a pyrolyzed metal-doped copolymer supported on the internal and external surfaces of the carbon particles. The pyrolyzed, metal-doped copolymer is in the form of a metal/nitrogen-carbon complex, or a metal-doped heterocarbon/nitrogen complex. Catalyzed carbon particles, having the pyrolyzed polymerized metal-doped material supported on and in pores of the carbon particles, are mixed with a binder and then pressed and formed into a suitably shaped substrate for application to a support current collector of an electrochemical cell.

Substrates of catalyzed carbon particles are prepared by first reacting an amine compound with formaldehyde and/or polymerized formaldehyde in solution, in the presence of a catalyst, carbon particles and metal salt, at a temperature and at a rate of stirring sufficient to provide a polymerized product in the form of a gel. Then the gel is heated (pyrolyzed) in an inert atmosphere for a time sufficient to provide the catalyzed carbon particles in the form of a powder. The powder is then mixed with a binder, and pressed and formed into a suitably shaped catalytic substrate of catalyzed carbon.

Preferably, the polymerization reaction occurs at a temperature of 60° C. to 100° C., while stirring at a moderate rate of stirring sufficient to maintain carbon in suspension. The reaction normally is complete in less than a few minutes and is typically quite exothermic. Preferably, the pH of the solution is 1 to 4. The gel preferably is pyrolyzed by heating at 800° C. to 1000° C.

A wide range of organic amines are suitable precursors for the heterocarbon. In general, most of the aliphatic di, and polyamines are suitable as long as they will react with formaldehyde to form polymers. Some of the most desirable and low cost are urea, melamine and dicyandiamide. Also usable are the simple di, and polyamines such as ethylenediamine and triethylenetetramine which are used commercially as epoxy resin hardeners. Also suitable are some of the aromatic di amines such as m-phenylenediamine, although these materials do not give as high activity as the aliphatic types.

All the selected polymers have at least one nitrogen per 5 carbon atoms and, advantageously, are capable of being polymerized from an aqueous solution by the polymerization method of the invention. The method thus adds the metal-dopant (metal ions) to the polymer and then complexes the metal to the heterocarbon formed.

The metal used to prepare the metal-doped heterocarbon is preferably derived from one or more salts of cobalt, nickel, iron, copper, vanadium, chromium and manganese, also referred to as metal compounds.

In an alternative embodiment, an intermediate methylol compound is formed by reaction of the amine and formaldehyde, and then the metal compound and carbon particles are added. In this alternative method, an amine compound is reacted with formaldehyde and/or polymerized formaldehyde in the presence of an alkali catalyst, in solution at a temperature sufficient to form a methylol compound. Then, the metal compound, carbon particles, and an organic acid catalyst are added to the methylol containing solution while stirring to polymerize the methylol compound at a temperature and at a rate of stirring sufficient to provide a polymerized product in the form of a gel. Then the gel is heated (pyrolyzed) to form the powder. This process is preferred for urea, melamine, dicyandiamide, ethylenediamine and triethylenetetramine.

The electrodes are formed from carbon particles having particular physical properties. A catalytic substrate suitable for use with an acid electrolyte has carbon particles with internal and external pores comprising a total surface area of over about 300 m$^2$/g, over 30% of the pores are mesopores of a size greater than about 20 angstroms, and between about 15% and about 20% of the pores are micropores of a size less than about 20 angstroms. Preferably, over 70% of the surface area comprises the mesopores.

A catalytic substrate suitable for use with an alkaline electrolyte has carbon particles with a total surface area of about 100 to about 150 m$^2$/g, and between about 15% and about 20% of the pores comprising the surface area are micropores of a size less than about 20 angstroms.

The invention provides substrates having polymerized metal-doped material supported on carbon particles which are less costly than catalyzed substrates (catalysts) such as porphyrins and precious metals. The invention provides a new process of forming electrodes, and electrodes formed thereby, which are suitable for a variety of uses such as in metal-air batteries, as oxygen sensors, oxygen recombination catalysts and end-of-charge detection for use with batteries.

These and other objects, features and advantages will become apparent from the following description of the preferred embodiments, appended claims and accompanying drawings.

DETAILED DESCRIPTION OF THE PREFERRED EMBODIMENTS

Figure 1:
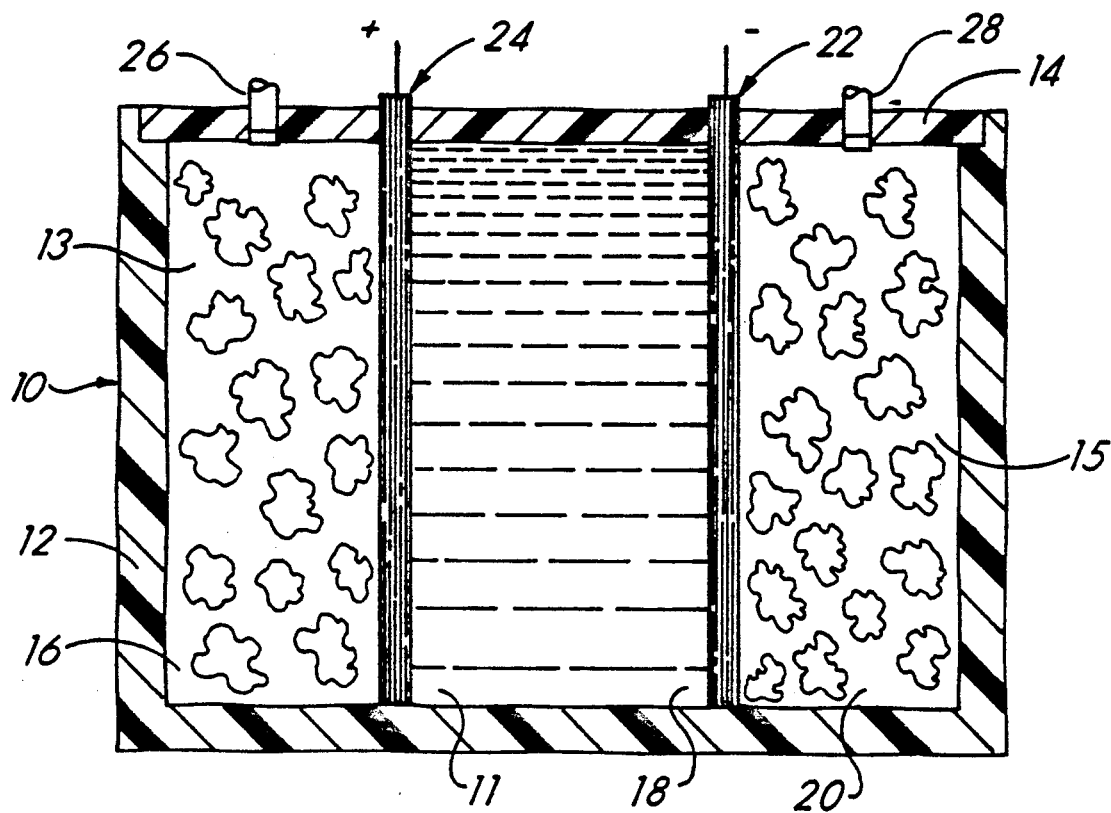
FIG. 1 is a cross-section schematic view of a simplified fuel cell.

FIG. 1 shows a simplified cross-sectional schematic view of a typical electrochemical cell 10 having a case 12 and cover 14. This fuel cell is divided into three chambers, the first chamber 16 holding a gaseous fuel such as hydrogen 13, the second chamber 18 holding the electrolyte 11 and the third chamber 20 holding a gaseous oxidant 15 such as oxygen or air. Inlet ports 26 and 28 provide means for supplying the gaseous fuel and oxidant. Electrode 24 which is normally referred to as a hydrogen anode, separates the first chamber from the second chamber. The cathode 22, which separates the second chamber from the third chamber, is commonly referred to as an air cathode.

Figure 2:
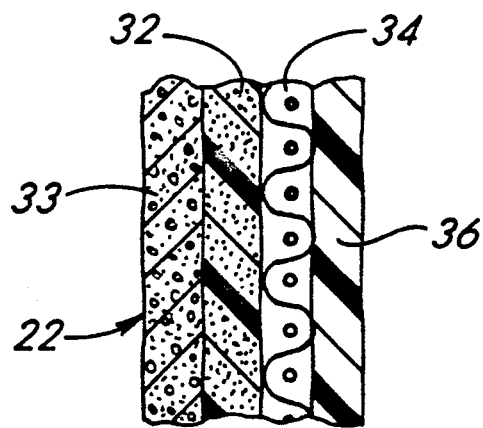
FIG. 2 is a cross-sectional view of an air cathode of a fuel cell as in FIG. 1.

FIG. 2 is a cross-sectional view of air cathode 22 operable in the cell of FIG. 1. One layer of cathode 22 is an electro-catalytic carbon substrate 32 composed of catalytic carbon particles, having a metal-doped heterocarbon/nitrogen copolymer supported on internal and external surfaces of the carbon particles. Preferably, the carbon substrate layer is coated with a NAFION or strontium acetate film 33 which faces the liquid electrolyte 11. An optional hydrophobic layer 36 prevents seepage of electrolyte 11 into the air or oxygen 15 in chamber 20.

The catalyzed carbon particles are prepared by first reacting an amine compound with formaldehyde and/or polymerized formaldehyde in solution, in the presence of a catalyst, carbon particles and a metal salt, at a temperature and at a rate of stirring sufficient to provide a polymerized product in the form of a gel. Then the gel is heated in an inert atmosphere for a time sufficient to provide the catalyzed carbon particles in the form of a powder.

Preferably, the reaction occurs at a temperature of 60° C. to 100° C., while stirring at a rate of 50 to 100 RPM. Preferably the pH of the solution is 1 to 4. The gel preferably is pyrolyzed by heating at 800° C. to 1000° C.

A wide range of organic amines are suitable precursors for the heterocarbon. In general, most of the aliphatic di, and polyamines are suitable as long as they will react with formaldehyde to form polymers. Some of the most desirable and low cost are urea, melamine and dicyandiamide. Also usable are the simple di, and polyamines such as ethylenediamine and triethylenetetramine which are used commercially as epoxy resin hardeners. Also suitable are some of the aromatic di amines such as m-phenylenediamine, although these materials do not give as high activity as the aliphatic types.

All the selected polymers have at least one nitrogen per 5 carbon atoms and, advantageously, are capable of being polymerized from an aqueous solution by the polymerization method of the invention, thereby adding the metal-dopant (metal-complex) to the polymer and to the heterocarbon formed. As used herein, the term metal-doped refers to a metal/heterocarbon/nitrogen complex. The nature of the active sites are not well known, but it appears the metal is included as a metal/nitrogen-carbon structure. Typically, the metal is arranged adjacent several nitrogen atoms in the final pyrolyzed structure. Metal-heterocarbon complexes are also referred to as metal macrocyclic complexes.

The metal used to prepare the metal-doped heterocarbon is preferably one or more of cobalt, nickel, iron, copper, vanadium, chromium and manganese. Mixtures of metals may be used.

In an alternative embodiment, an intermediate methylol compound is formed by reaction of the amine and formaldehyde, and then the metal compound and carbon particles are added. In this alternative method, an amine compound is reacted with formaldehyde and/or polymerized formaldehyde in the presence of an alkali catalyst, in solution at a temperature sufficient to form a methylol compound. Then, the metal compound (metal salt), carbon particles, and an organic acid catalyst are added to the methylol containing solution while stirring to polymerize the methylol compound at a temperature and at a rate of stirring sufficient to provide a polymerized product in the form of a gel. Then the gel is heated (pyrolyzed) to form the powder. This process is preferred for urea, melamine, dicyandiamide, ethylenediamine and triethylenetetramine.

The carbon particles of the substrate have internal and external surfaces defining a plethora of pores. The metal-doped pyrolyzed copolymer, formed from polymerization of an amine compound and formaldehyde and the fine metal particles of the metal salt, is primarily supported on the surfaces of the carbon particles, and primarily on the mesopores, although some micropores may be sufficiently large enough to support the metal-doped pyrolyzed copolymer.

The proper selection of the carbon support material is important for the highest activity in acid electrolyte systems such as in methanol fuel cells. The best supports are those carbon blacks which have BET surface areas (total pore area) of about 300 to about 500 m$^2$/g, highest mesopore area (external pore area above about 20 angstroms diameter), but which still contain about 15% to about 20% of micropores. Other active carbons with large mesopore area give good activity, but are unstable for long use due to the very high micropore areas. Unsuitable carbon blacks are those of the so-called EC (extra conductive) type which have a "cracked eggshell" structure, and do not have suitable gas distribution structures. For use in alkaline electrolytes such as in hydrogen fuel cells, carbon blacks with an total pore area of about 100 m$^2$/g to about 150 m$^2$/g, and about 15% to about 20% micropores are more desirable and have higher stability. Of particular value as supports for alkaline use are the "Tailored Carbons", prepared by a method as described in my U.S. Pat. No. 3,985,578. This method includes: 1) mixing a conventional carbon black material with a solution or an emulsion of poly (vinylidene chloride); 2) drying the resulting mixture; 3) dehydrochlorinating the blend to transform the polymer into a char; and baking the blend at a temperature within the range of from 700° C. to 1,400° C.

EXAMPLE 1

Figure 3:
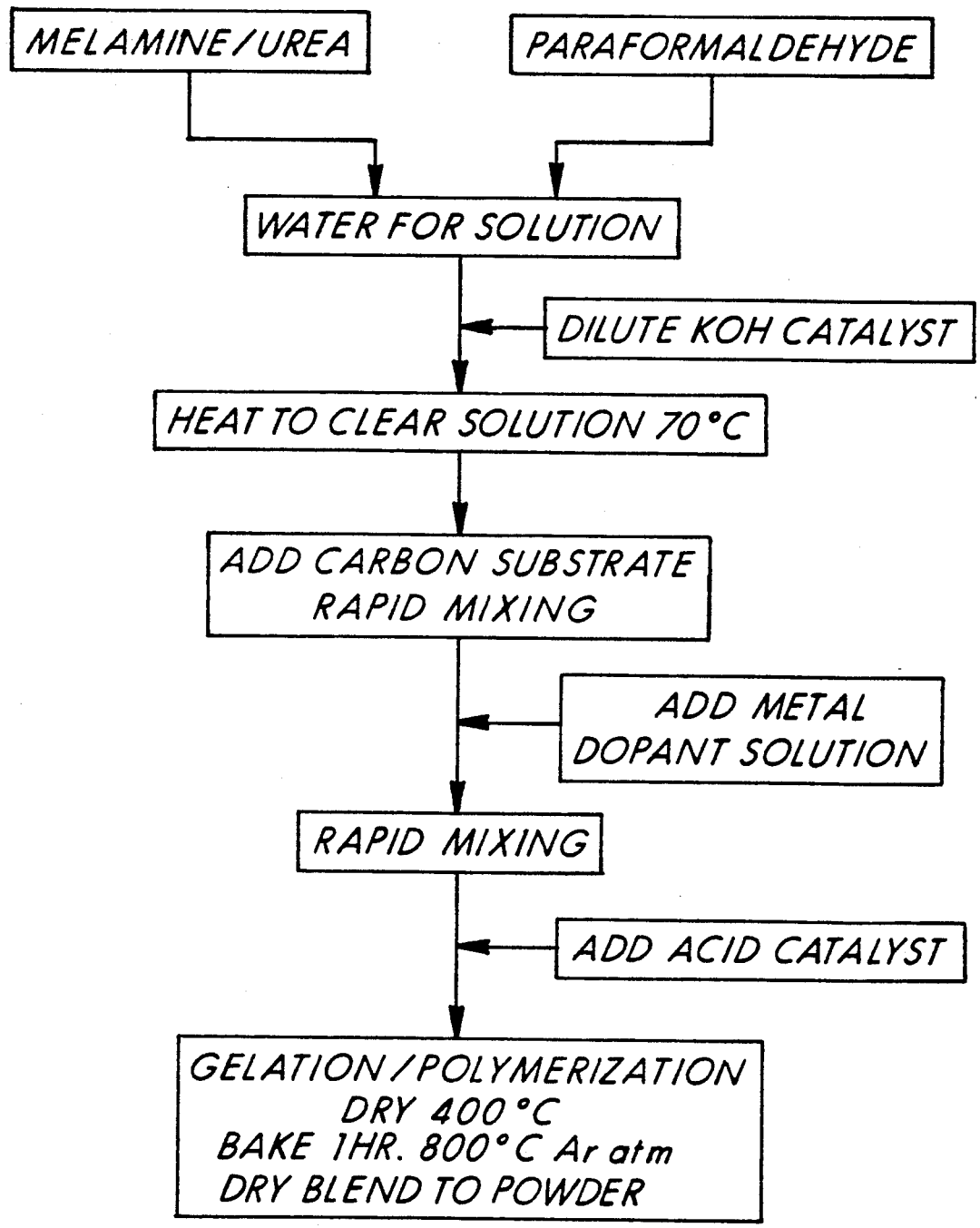
FIG. 3 is a flow diagram of a preferred process of the invention.

Catalyzed supports were prepared from formaldehyde and the respective amine heterocarbons: melamine, urea and dicyandiamide. In each case, the starting materials contain at least two $NH_2$ groups (for urea and dicyandiamide), and three $NH_2$ groups for melamine. These compounds were reacted with the equivalent of at least about one molecule of formaldehyde ($CH_2O$) per $NH_2$ group ($CH_2O/NH_2$) in aqueous media with a mild alkaline catalyst to form the methylol stage of the polymer which is water soluble. The source of formaldehyde was the preferred paraformaldehyde. This reaction took place at a temperature which varied from about 50° C. to about 60° C. The desired metal salt and the carbon substrate were added to the methylol containing solution with rapid stirring at a rate of 50 to 100 RPM. The polymerization was then initiated by the addition of an acid catalyst. Hydrochloric acid gave good results. Other acids found suitable are acetic and trichloracetic acids. The reaction catalyzed by the acid is complete in less than a few minutes and is normally quite exothermic (liberates heat). The general procedure for this example is as shown in the flow diagram of FIG. 3.

Both formaldehyde $(CH_2O)_{n=1}$ and polymerized formaldehyde $(CH_2O)_{n>1}$ are suitable, with paraformaldehyde being preferred. Best results were obtained when the amount of the preferred polymerized formaldehyde $(CH_2O)_{n>1}$ added to the selected amide provided the equivalent of one molecule ($CH_2O$) per each amide group with a 10% by weight excess. The standard formulations used in this example contained 0.10 moles of the nitrogen compound and the appropriate number of moles of formaldehyde, preferably as polymerized formaldehyde $(CH_2O)_{n>1}$. This amounted to 0.30 moles ($CH_2O$) for each 0.1 mole melamine. Correspondingly, 0.20 moles of ($CH_2O$) were used for the urea and dicyandiamide, each with two $NH_2$ groups. In each case, these amounts were used with 10 g of the selected substrate carbon and 50 to 100 ml water. The amount of metal additive used was about 0.01 moles. In the case of iron, this was equivalent to about 0.56 g of the metal salt ferrous acetate. The proportion of carbon and equivalent metal derived from the metal salt was about 5 to about 6 grams metal for each 100 grams of carbon particles. This was about 4 to about 7 parts metal on the basis of 100 parts metal plus carbon. Mixtures of cobalt and iron were also used, but appeared to provide no advantage over a single metal.

The amount of water used in these preparations was controlled so as to not only give complete solution of the ingredients, but to give a final polymerized product which may be classified as a firm "gel". The resulting gel was then broken up and dried to 370° C. in a closed container followed by a final heating to about 1000° C. in an argon atmosphere for a period of about one hour. While a range of temperatures from 600° C. to 1000° C. is suitable, the most common temperature for the final heating was 800° C.

EXAMPLE 2

A somewhat different process was required for catalyzed carbons made from m-phenylenediamine since this compound is not water soluble. For m-phenylenediamine, the amine was first dissolved in concentrated HCl and then diluted with water to 200 ml and heated to 50° C. to 60° C. The carbon, polymerized formaldehyde $(CH_2O)_{n>1}$ and metal salt were then added to this hot solution and the polymerization then took place quite rapidly.

The carbon yield from the various polymers of Examples 1 and 2 amounted to about 3.0 g at 800° C. The average total yield for a 10 g substrate carbon was in the range of 12.5–13.5 g. A considerable number of variations in the amount of heterocarbons to substrate carbon and the amount of metal are possible, but the best results were with the preferred amounts described above. On the basis of one mole of amine compound, the preferred amounts correspond to: a) one formaldehyde molecule times the number of $NH_2$ groups in the one mole of the amine compound; b) 100 g of the selected carbon substrate; c) 500 to 1000 ml water; and d) 0.1 mole metal salt. Reagents are as shown in Table I(a). A number of the base polymer carbons and the supported catalyzed heterocarbons were analyzed for nitrogen content and the surface area-pore distribution measured by nitrogen absorption using the Quantachrome Analyzer for the micro and mesopore areas.

Figure 4:
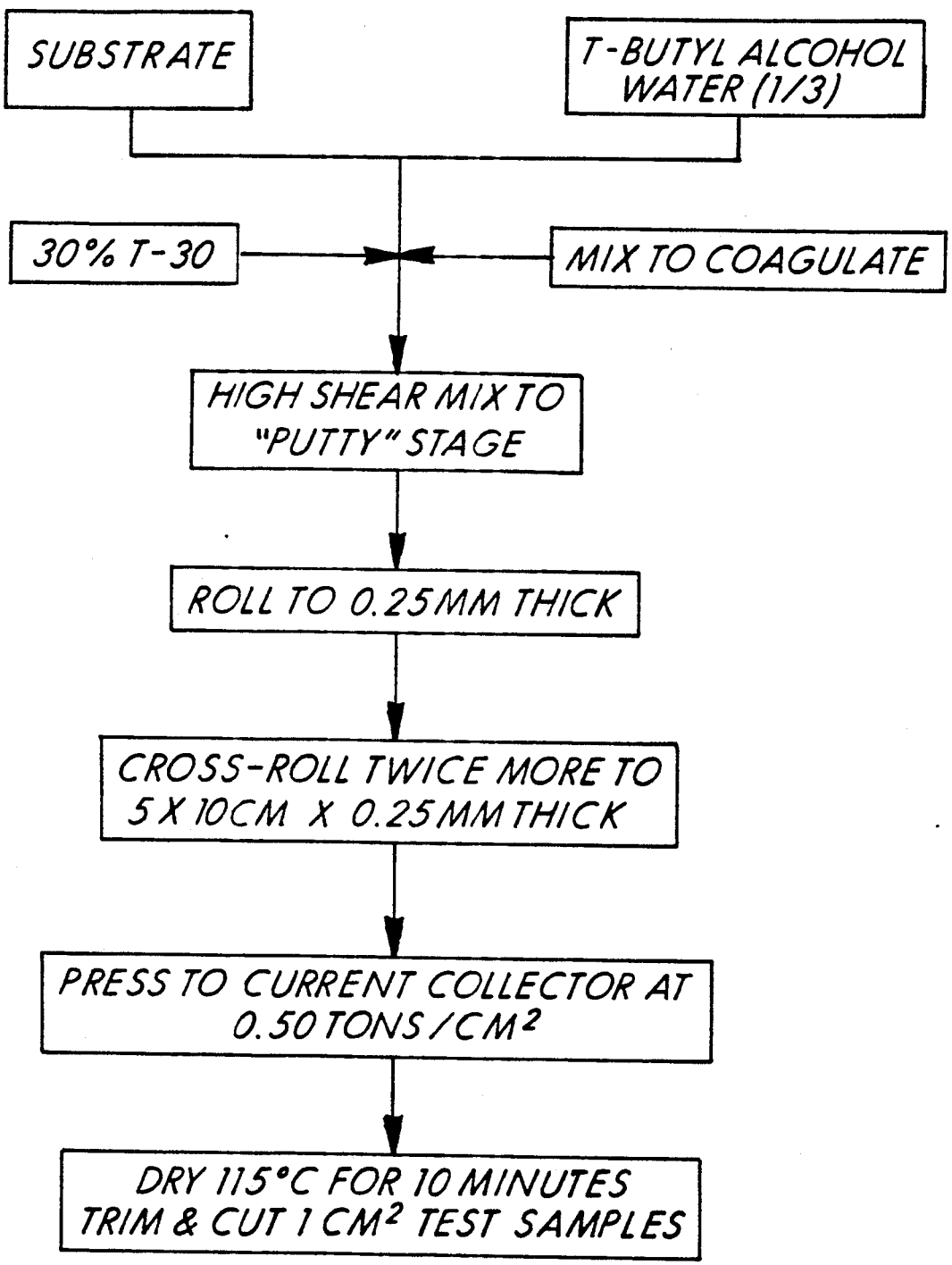
FIG. 4 is a flow diagram of a process for forming electrodes using the catalyzed carbon substrate of FIG. 3.

A general procedure for preparing electrodes from the catalyzed carbon substrates of the invention is as shown in the flow diagram of FIG. 4. The process involves the pretreatment of 1 g of the catalyzed carbon particles with a 90% TBA-water (T-butyl alcohol) solution, followed by the addition of the desired amount of polytetrafluoroethylene (PTFE) binder from a suspension in water. This pasty mass is then mixed in a small plastic beaker with a plastic rod until a putty-like ball consistency is reached. This ball is then hand-rolled on an acrylic sheet to a thickness of 0.25 mm. It is then folded and rolled once again to 0.25 mm thick. This sheet is folded so as to give the desired final width and once again rolled to 0.25 mm thick. The final sheet is trimmed to 5 cm × 10 cm and pressed to the current collector at a pressure of 20 tons. After drying to remove water and TBA, the electrode is complete.

TABLE I(a)

| REAGENTS | |
|---|---|
| Reagent | Supplier |
| Ferrous acetate | J.T. Baker Chem. Co. |
| Cupric acetate | J.T. Baker Chem. Co. |
| Nickel acetate | J.T. Baker Chem. Co. |
| Cobalt acetate | Alfa Ventron |
| Chromic acetate | Alfa Ventron |
| Manganese acetate | Alfa Ventron |
| Vanadium pentoxide | Alfa Ventron |
| Platinum metal salts | Matthey-Bishop |
| Acetic acid, glacial | J.T. Baker Chem. Co. |
| Ammonium hydroxide | J.T. Baker Chem Co. |
| Hydrochloric acid | J.T. Baker Chem Co. |
| Melamine | Eastman Kodak |
| Urea | EM Science Inc. |
| Paraformaldehyde | EM Science Inc. |
| Dicyandiamide | Alfa Ventron |
| Benzoly peroxide | Alfa Ventron |
| m-phenylenediamine | Aldrich Chem. Co. |

TABLE I(b)

| CARBON SUBSTRATES | | | | |
|---|---|---|---|---|
| Substrate | Source | Area $m^2/g$ | Micropores $m^2/g$ | Mesopores $m^2/g$ |
| Raven-5000 | Columbian | 470 | 140 | 330 |
| Raven-1020 | Columbian | 97 | 5 | 92 |
| NSMK-III | Columbian | 622 | 388 | 234 |
| Conductex 975 | Columbian | 250 | 100 | 153 |
| RBDA act. c. | Calgon | 1100 | 829 | 267 |

TABLE I(b)-continued

| | CARBON SUBSTRATES | | | |
|---|---|---|---|---|
| Substrate | Source | Area m²/g | Micropores m²/g | Mesopores m²/g |
| Ketjen Black | Akzo Chem. | 886 | 95 | 680 |
| Vulcan XC-72 | Cabot Co. | 254 | 154 | 100 |

TABLE II

| Nitrogen Contents for Various Catalysts | |
|---|---|
| Catalyst System | Nitrogen Content, w/o |
| Dicyandiamide carbon (DCD) 800° C. | 19 |
| Melamine/formaldehyde (MF) 20 carbon 850° C. | |
| Raven-5000, MF carbon 25%' | 11 |
| same + 5% iron | 10 |
| Raven-5000, urea/formaldehyde, (UF) carbon + 5% iron | 5 |
| Raven-5000, m-phenylenediamine, (MPhD) carbon + 5% iron | 16 |

TABLE III

| SAPD Data for Selected Substrates/Catalysts | | |
|---|---|---|
| Carbon Material | Micropore Area, m²/g | Mesopore Area, m²/g |
| Raven-5000 as rec'd | 115 | 333 |
| same 1000° C. HT | 145 | 336 |
| same + std MF catalyst | 70 | 307 |
| same + MF + Fe catalyst | 73 | 269 |
| same + MPhD + Fe catalyst | 19 | 38 |
| RBDA carbon as rec'd | 829 | 267 |
| same + MF + Co | 611 | 231 |

ELECTROCHEMICAL MEASUREMENTS

The electrochemical properties of the various substrates of catalyzed carbon are all reported as polarization data for semi-hydrophobic diffusion electrodes containing 15 w/o Teflon PTFE T-30B (DuPont Corp.) binder. Potentials were measured against a reversible hydrogen reference electrode (RHE) in 2N $H_2SO_4$ at 25° C. or in 4N KOH at the same temperature, in a configuration similar to FIG. 1. Potentials were corrected for ohmic drop in the electrolyte. Electrodes were mainly evaluated in 2N $H_2SO_4$ at 25° C., but a few measurements were also made in 4N KOH at the same temperature.

Figure 5:
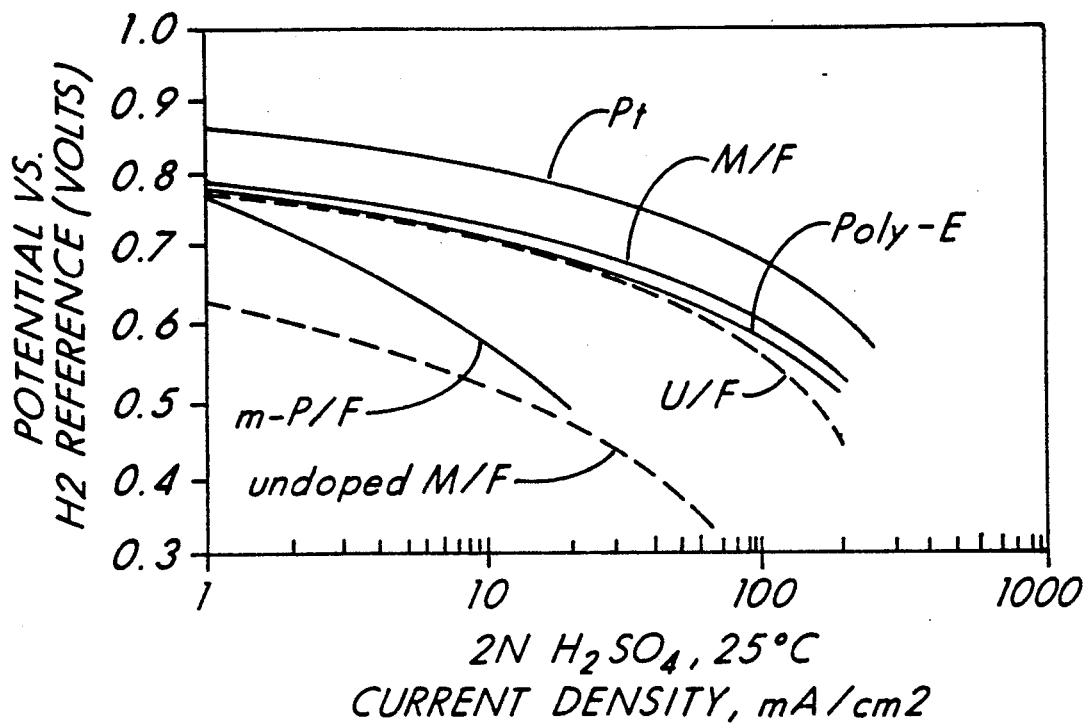
FIGS. 5-9 are graphs showing air electrode polarization data compared to a reference $H_2$ electrode in a fuel cell for various air electrode substrates.

FIG. 5 is a comparison of several cobalt-doped heterocarbon/nitrogen catalysts with 10 w/o platinum all on Raven-5000 support carbon. In FIGS. 5–8, the following designations are used: platinum (Pt), melamine/formaldehyde catalyst (M/F), polyethyleneimine catalyst (Poly-E), urea/formaldehyde catalyst (U/F), meta-phenylenediamine/formaldehyde catalyst (m-P/F), undoped melamine/formaldehyde catalyst (undoped M/F), iron tetrapyridyl porphyrin (Fe/tetra P/P), cobalt (Co), chromium (Cr), vanadium (V), copper (Cu), undoped metal-free heterocarbon (undoped HC), nickel (Ni), Raven-5000 (R-5000), Ketjen black (KB), Raven-1020 (R-1020), Vulcan XC-72 (VXC-72), cobalt-doped heterocarbon (Co/HC). FIG. 5 shows the polarization characteristics of melamine/formaldehyde (M/F) catalysts and the same catalyst supported on Raven-5000 carbon black with and without the addition of cobalt. The cobalt is in the amount of 0.01 moles for a 10 g lot of carbon which amounts to about 4% by weight of the total carbon/catalyst mass. As expected, the base carbon black has very little activity. With the addition of the heterocarbon/nitrogen catalyst, there is a significant increase in the electrode activity which is further improved through the addition of cobalt to the composition. Also shown is the activity for the plain heterocarbon/nitrogen material. The activity of catalysts made from dicyandiamide, urea or poly (ethylenediamine) with cobalt-dopant on the same substrate gave similar performances. As can be seen in FIG. 5, metal-doped heterocarbon/nitrogen catalyzed carbons of the invention produce current densities nearly as good as that of conventional platinum loaded carbon. This performance is particularly striking since the metal loading of the heterocarbon catalysts is in the range of about 4% to about 7% of the total carbon plus metal weight; whereas the conventional platinum loaded carbon has 10 weight percent metal.

Figure 6:
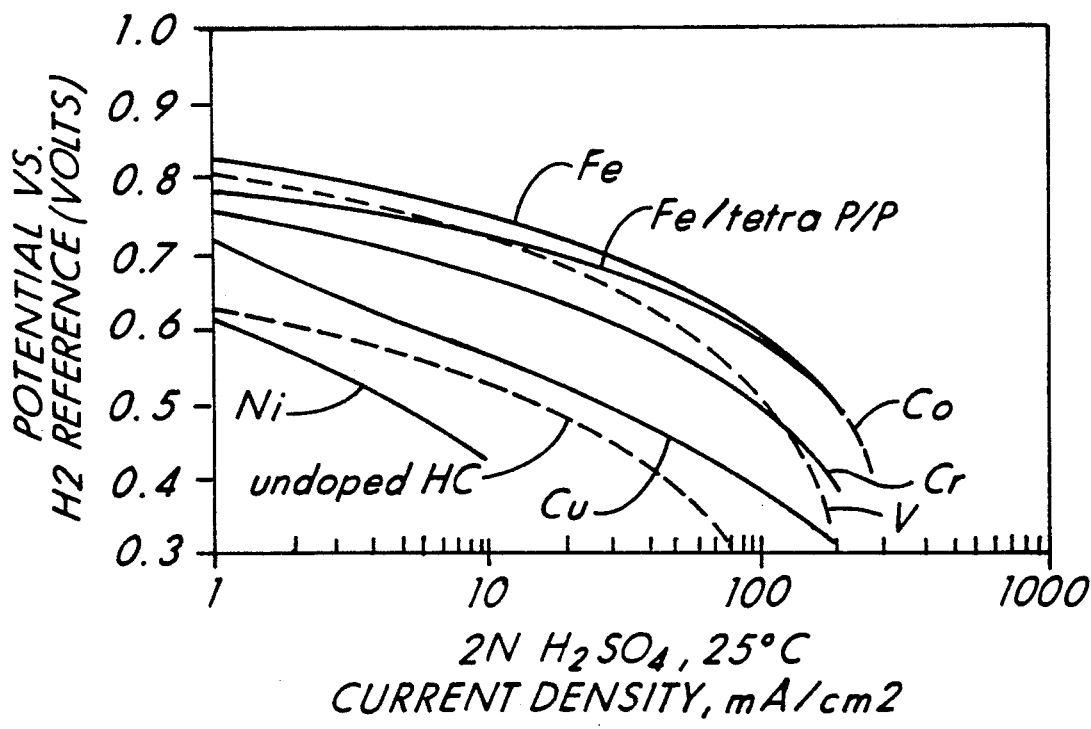

FIG. 6 shows the effects of various metal-dopants on pyrolyzed melamine/formaldehyde heterocarbon catalyst supported on Raven-5000 carbon black. FIG. 6 displays the effects of varying the metal additive to the same melamine based carbon supported on Raven-5000 and pyrolyzed at 800° C. Metals are all added at a fixed 0.01 atomic weight per standard 10 g lot of carbon. Measurements were made on the normally used Fe, Co, and Ni; as well as Cu, Mn, Cr, V, Pt, and Pd. Some improvements were seen above the base line for the supported catalyst for all of the metal additives, with the exception of nickel. The most active additives were iron, cobalt and vanadium with all the other additives showing significantly lower performance. Vanadium, however, is not known to be so active. This was the only metal additive which gave load potentials above 0.80 V at 1.0 mA/cm² other than iron. For the present series of tests, the cobalt containing catalysts gave higher performance at 0.20 A/cm² than Fe, but were slightly lower at the lowest test current density. The most surprising part of the metal additive tests were that the Pt and Pd samples were less active than any of the metals tested other than Ni. Apparently, the heterocarbon/nitrogen catalyst almost entirely deactivates these metals.

SUBSTRATE EFFECTS

Selection of carbon substrates was found to significantly affect catalyzed substrate performance. Of particular interest is the surface area/pore distribution (SAPD) analysis of the carbon particles. It was found that maximum activity occurred with the catalysts dispersed on carbon particles having the highest mesopore area in a configuration where oxygen has access to the active sites. From a practical standpoint, this amounted to using a carbon black particles of conventional type with the smallest spherical diameter available. The smallest available particle diameter carbon black today is Raven-5000 (Table I(b)), with 120A diameter particles and a mesopore area of 330 m²/g. This material was selected as the standard to prepare samples by the method of Examples 1 and 2. However, other materials were used in the method to check the hypothesis that the best results are obtained with the highest external area carbons. While Ketjen black (Table I(b)) has a much higher mesopore area of 680 m²/g, the particle size is 300A and the structure is what has been called a "cracked eggshell" with both internal and external mesopores which would not all be used in air cathodes. The nitrogen contents of several catalysts at various temperatures and some compositions with added metals are shown in Table II.

It appears that the general effect of adding the catalyst to the support carbon is a reduction in both the micropores and the mesopores with the greatest decrease being seen in the micropores. The most significant reduction in the micropores is seen with the RBDA carbon although the Raven-5000 is also affected. Of greatest importance, however, is the fact that the mesopore area remains relatively high with the melamine based catalysts. The catalysts made from m-phenylenediamine show an extreme loss in both micropore and mesopore areas, which is not explainable other than that the carbon derived from this compound with formaldehyde, appears to be much harder and denser than those derived from melamine or urea. Of the two support carbons, the carbon black (R-5000) has the highest effective area after the catalyst is added to the base carbon.

Figure 7:
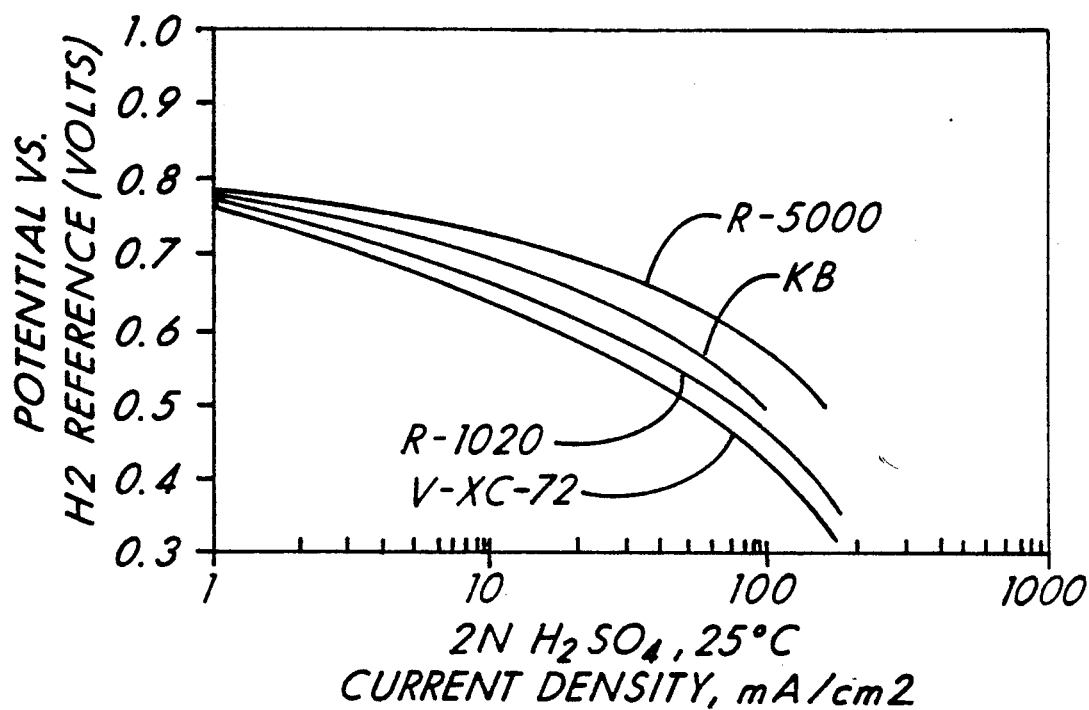

The general hypothesis of maximized external surface seems to be true. FIG. 7 shows the effects of carbon substrate on the polarization of cobalt-doped melamine/formaldehyde heterocarbon catalyst. In FIG. 7 melamine/formaldehyde/cobalt (MF-Co) catalyst is supported on several different carbons including an active carbon RBDA, the standard R-5000, NSM-III, Vulcan XC-72, Ketjen black (KB) and Raven-1020 (SAPD Table II(b)). At low current densities, the performance is the same with all substrates as might be expected. At the high current density (HCD) end of the data, however, there are some differences. VXC-72 has the lowest mesopore area and has the lowest performance at the highest current density tested of 0.20 A/cm$^2$. The RBDA active carbon and R-5000 along with the NSM-III carbon blacks have nearly equivalent behavior, although the NSM-III has a lower external area. The higher three dimensional structure of the carbon or its higher acidic nature may play a role. At the normal heterocarbon addition of 25% by weight to the KB electrodes, performance at the HCD end is very poor compared with the other electrodes. Even when the loading is doubled to 50%, the polarization is still significantly higher than the other mesopore carbons.

Ideally, all the polymer should be retained within the carbon matrix for best results. There should be no visible evidence of free metal salt or polymer. The polymerized mixture should be a uniformly black frangible gel with no metal ion color or free white polymer.

Theoretically, there should be no need for the amount of added catalyst to exceed a monolayer, since only the surface layers would be active. Any amounts greater than monolayers would only result in a reduction of the external and internal area of the support carbons. Some surface area SAPD values of base carbons and the same materials with added heterocarbon catalysts are listed in Table III.

Rough estimates of the amount of heterocarbons needed to give what might be considered as a monolayer coverage of 2-5A thickness come out to be in the 20-25% by weight range for a mesopore area of 300 m$^2$/g. This amount has been used for the standard formulation. A number of preparations have been made with additions of heterocarbons at 12.5 and 50% by weight of the standard R-5000 carbon with a decrease seen at the lower level and no improvement with an increase to double the standard level. Variations in the metal content above and below the standard amount of 0.01 moles of metal for a 10 g carbon lot with 2.5 g of heterocarbons, once again showed a decrease at the lower level and no improvement at higher levels.

COMPARISON WITH PORPHYRINS

When iron tetrapyridyl porphyrin (FeTPYP) is supported on R-5000 carbon black at 20 w/o, and pyrolyzed at 800° C., the electrochemical performance is essentially equal to the data for both the iron and cobalt heterocarbons derived from melamine on the same support carbon shown in FIG. 6. The performances are effectively the same out to 200 mA/cm$^2$ with the cobalt being about 40 mV lower at 1 mA/cm$^2$. Above the 200 mA/cm$^2$ value, the porphyrin falls off rapidly whereas the cobalt heterocarbons are stable to 400 mA/cm$^2$.

ALKALINE/ACID ELECTROLYTE COMPARISONS

Figure 8:
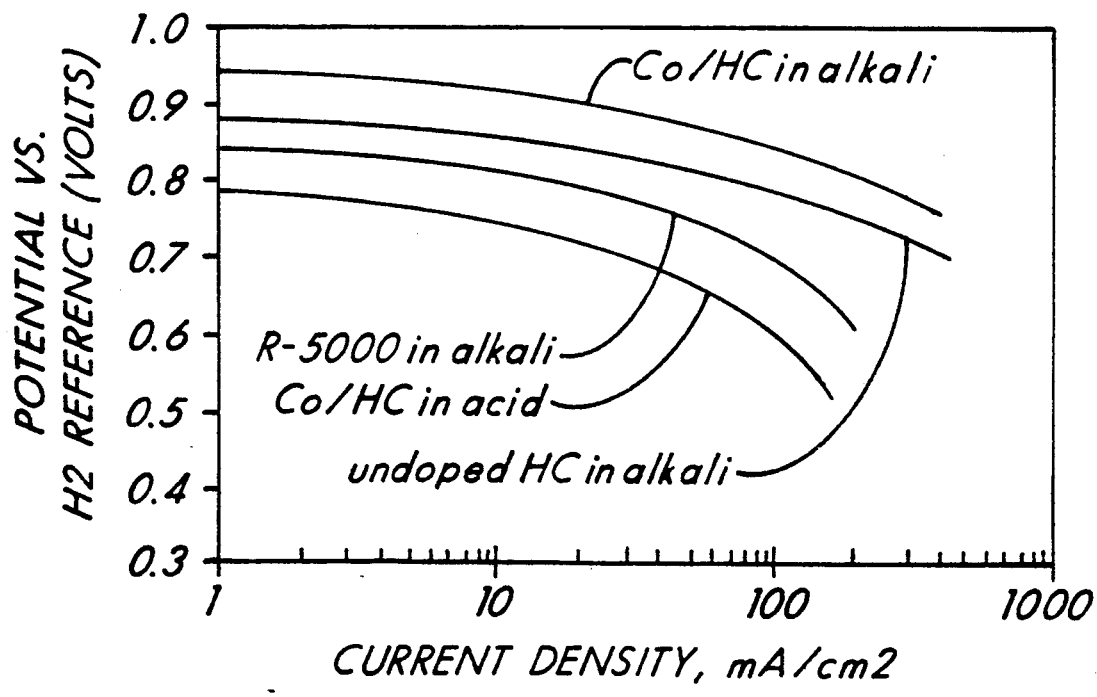

FIG. 8 shows the performance of the standard MF-Co heterocarbon/nitrogen catalyst supported on R-5000 carbon in 4N KOH (alkaline electrolyte) compared with the same catalyst in the acid electrolyte. The base carbon (1000° C. HT) and the heterocarbons without metal addition, are also shown. It is clearly evident that there is a significant improvement in the electrode potential just with the addition of the heterocarbons which is further enhanced by the addition of the cobalt.

Electrodes operated in alkaline as compared to acid electrolytes were observed during the so-called break-in time as the potential change during this time. In alkaline electrolytes, it is well known that the load potential starts more negative and gradually increases to more positive levels which can be 0.10 V or more higher than the initial values when stabilized. In acids, however, the potential under load continues to shift to more negative values (higher polarization) until a stable potential is reached. The phenomenon in alkaline electrolyte is attributed to a wetting process at the electrode where the electrolyte slowly reaches a maximum contact area with the electrode surface.

Figure 9:
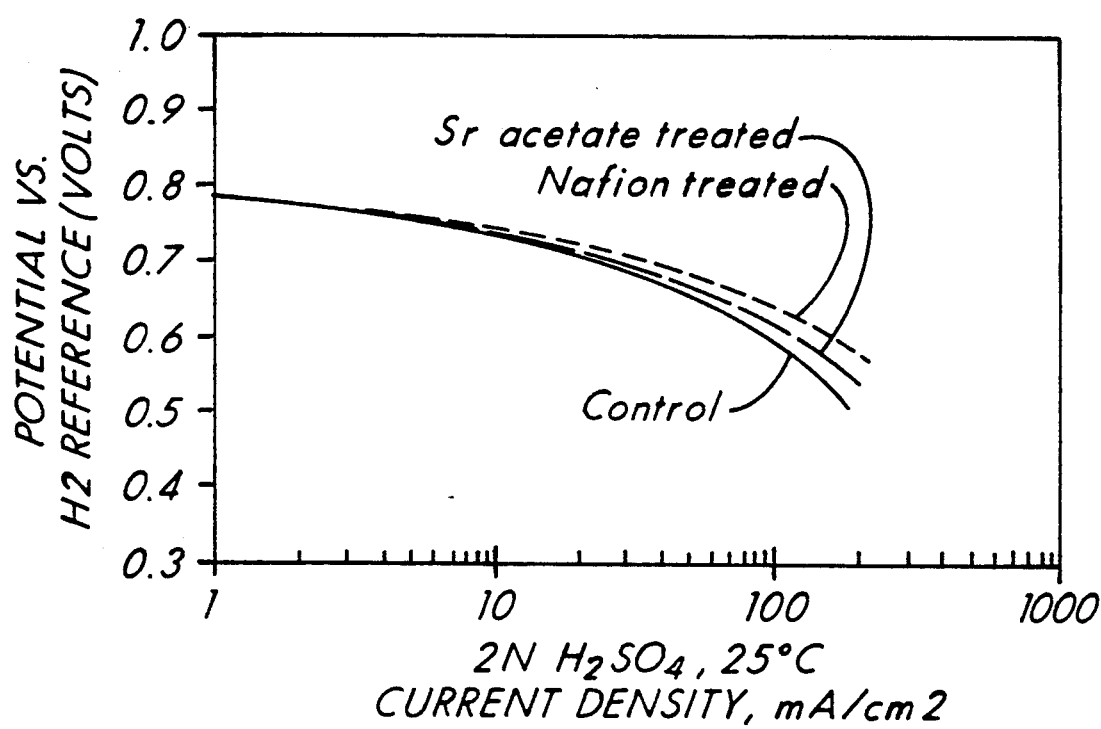

The hydrophilic/hydrophobic balance in these electrodes is apparently considerably different in acids than in alkaline systems. Several attempts to treat electrodes with hydrophilic layers did not give good results and resulted in poorer performance of the electrodes. Two procedures which gave some benefits to the electrodes were application of a 20–40 w/o solution of strontium acetate in 1 w/p Polyox-FRA (Union Carbide) followed by drying, and application of 5 w/o solution of NAFION 117. Each were applied to the hot electrode by brushing and drying to form a film. These procedures improved the high current density performance by about 30 mV for the NAFION and 70 mV for the SrAc$_2$ treatment. FIG. 9 shows hydrophilic treatment effects for pyrolyzed cobalt-doped melamine/formaldehyde heterocarbon on Raven-5000 carbon. This latter data represents the highest performance attained for any electrodes formed by the method of the invention. The stability of the electrodes was also found to be improved.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

I claim:

1. A process for preparing a catalyzed carbon suitable for use as an electrode comprising:

a) reacting an amine compound having at least one amine group with at least one material selected from the group consisting of formaldehyde and polymerized formaldehyde in the presence of an alkali catalyst, in solution at a temperature sufficient to form a methylol compound;

b) adding a metal salt of a catalytic metal, carbon particles, and an organic acid catalyst to the solution of step a) while stirring to polymerize the methylol compound at a temperature and at a rate of stirring sufficient to provide a polymerized product in the form of a gel; and c) heating the gel in an inert atmosphere for a time and at a temperature sufficient to form the catalyzed carbon as a metal/nitrogen/heterocarbon complex supported on internal and external surfaces of the carbon particles.

2. A process according to claim 1, wherein the material is present in an amount sufficient to provide the equivalent of at least one formaldehyde molecule for each one of the amine groups.

3. A process according to claim 1, wherein the temperature of steps (a) and (b) are each about 50° C. to about 100° C.

4. A process according to claim 1, wherein the metal salt is a salt of a metal selected from the group consisting of cobalt, nickel, iron, copper, vanadium, chromium, manganese and mixtures thereof.

5. A process according to claim 1, wherein the temperature of step (c) is about 600° C. to about 1000° C.

6. A process according to claim 1, wherein the pH of the solution is about 1 to about 4.

7. A process according to claim 1, wherein the amine compound is selected from the group consisting of urea, melamine, dicyandiamide, ethylenediamine, triethylenetetramine and mixtures thereof.

8. A process according to claim 1, wherein the water, the metal salt and the carbon particles are each present in an amount based on one gram mole of the amine group of 500 to 1,000 ml water, 0.1 mole metal acetate compound, and 100 grams of carbon particles.

9. A process for preparing a catalyzed carbon suitable for use as an electrode comprising:

a) reacting an amine compound with at least one material selected from the group consisting of formaldehyde and polymerized formaldehyde in solution, in the presence of a catalyst, carbon particles and a metal salt of a catalytic metal, at a temperature of at least about 50° C. and at a rate of stirring sufficient to provide a polymerized product in the form of a gel; and b) heating the gel in an inert atmosphere at a temperature and for a time sufficient to form the catalyzed carbon as a metal/nitrogen/heterocarbon complex supported on internal and external surfaces of the carbon particles.

10. A process according to claim 9, wherein the material is present in an amount sufficient to provide the equivalent of at least one formaldehyde molecule for each one of the amine groups.

11. A process according to claim 9, wherein the pH of the solution is 1 to 4.

12. A process according to claim 9, wherein the amine compound is m-phenylenediamine.

13. A process according to claim 9, wherein the water, the metal salt and the carbon particles are each present in an amount based on one gram mole of the amine group of 500 to 1,000 ml water, 0.1 mole metal acetate compound, and 100 grams of carbon particles.

14. A process according to claim 9, wherein the temperature of step (a) is about 50° C. to about 100° C.

15. A process according to claim 9, wherein the temperature of step (b) is about 600° C. to about 1000° C.

16. A process according to claim 9, wherein the metal salt is a salt of a metal selected from the group consisting of cobalt, nickel, iron, copper, vanadium, chromium, manganese and mixtures thereof.

* * * * *